June 11, 1935.                  J. E. JONES                 2,004,813
                                FUEL STOKER
                    Filed Aug. 17, 1931         3 Sheets-Sheet 1
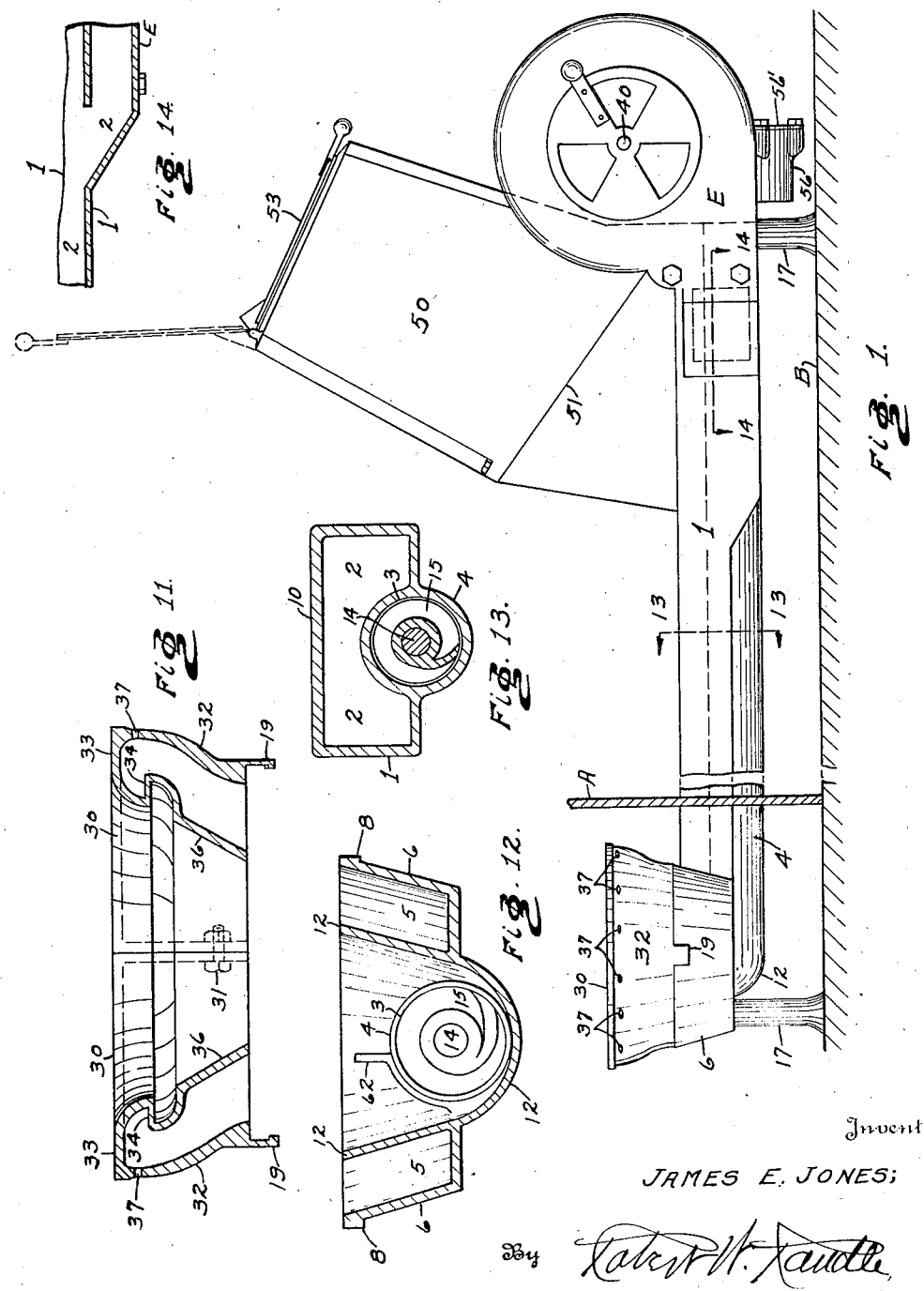
Inventor:
JAMES E. JONES;

June 11, 1935.  J. E. JONES  2,004,813
FUEL STOKER
Filed Aug. 17, 1931  3 Sheets-Sheet 2
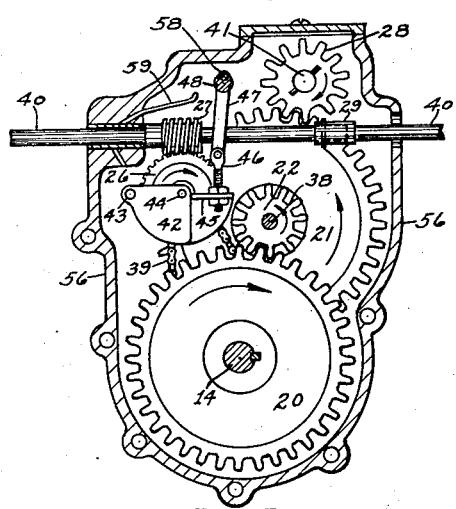
Fig. 5.
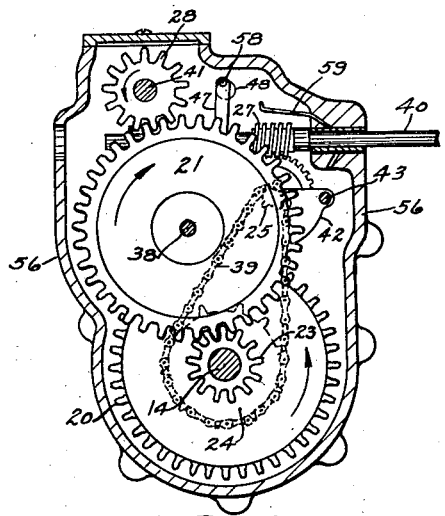
Fig. 6.
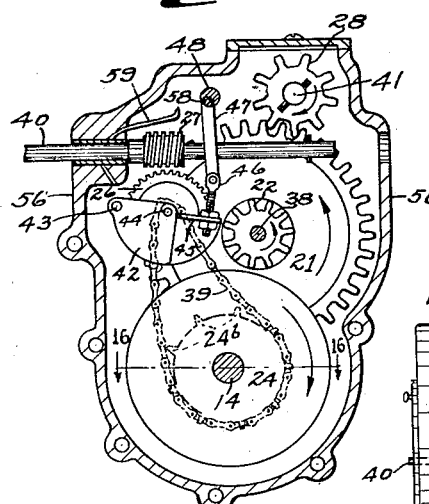
Fig. 7.
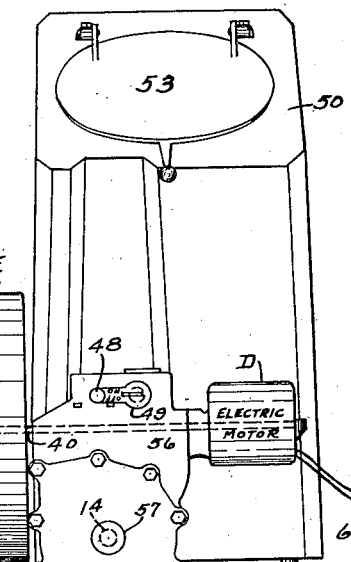
Fig. 2.
Fig. 15.
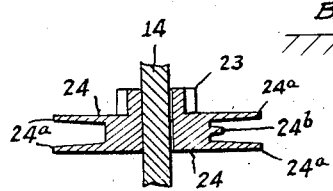
Fig. 16.
Inventor:
JAMES E. JONES;
By
Attorney.

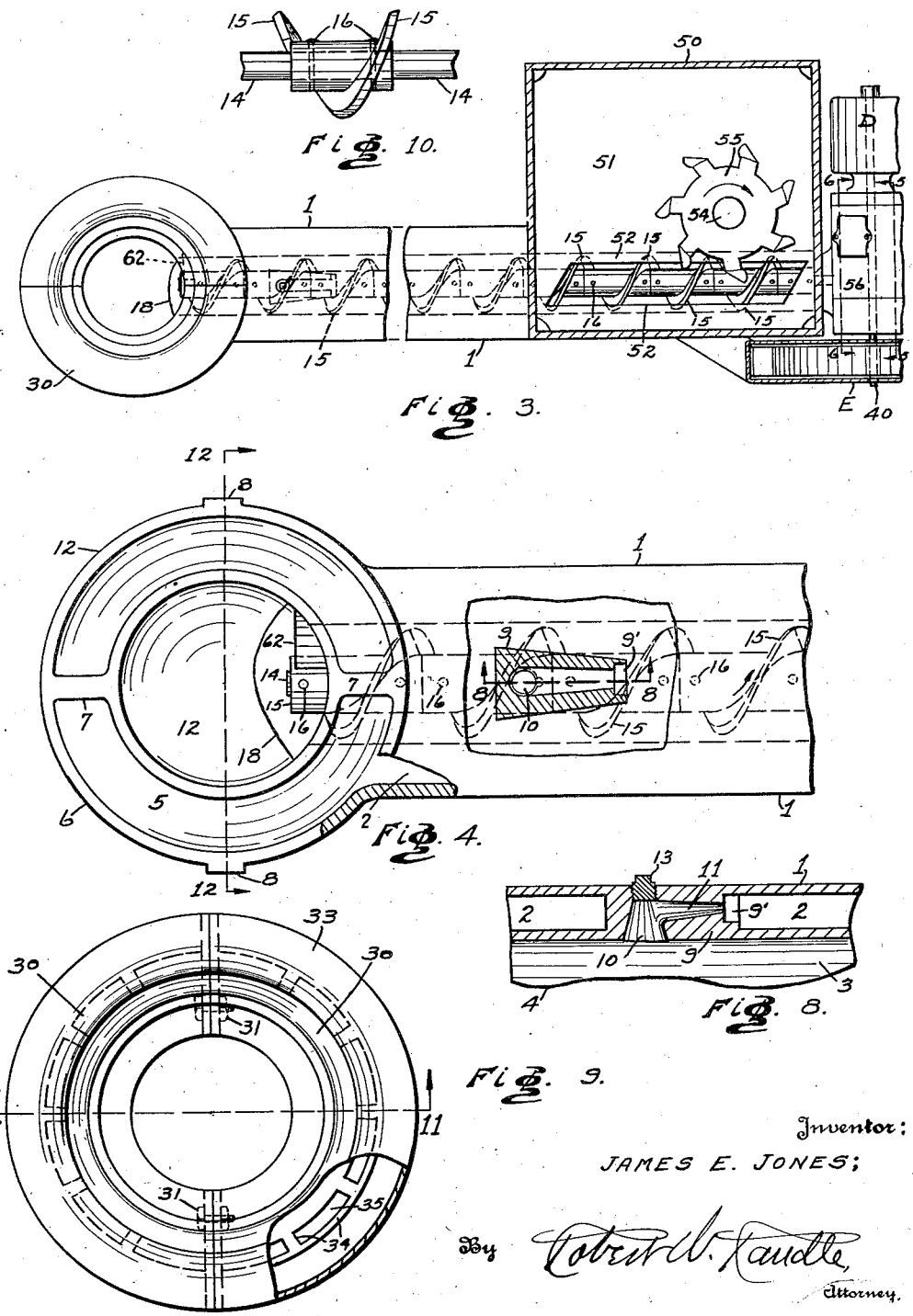

Patented June 11, 1935

2,004,813

UNITED STATES PATENT OFFICE 2,004,813

FUEL STOKER

James E. Jones, Richmond, Ind.

Application August 17, 1931, Serial No. 557,641

3 Claims. (Cl. 110—45)

The object of this invention, broadly stated, is the provision of an underfeed stoker, adapted to be employed in connection with a heating furnace, and including means for automatically conditioning and delivering the fuel, into the burner, in connection with an air blast, whereby every particle of the volatile elements contained in the fuel will generate usable heat units.

A further object is to provide a stoker which is adapted, if necessary, to pulverize the fuel, whereby it will be conveyed into the burner in small particles, and under pressure such as to deliver it at the point of combustion, and provide it with the amount of oxygen necessary for complete combustion, and without the escape therefrom of dust, smoke, soot, or gaseous fumes of any kind, as they will all be consumed, and by which every particle of the combustible content of the fuel will be utilized in the development of heat, leaving only a small vitrified residue, in the nature of clinkers which are easily removed from the combustion chamber of the burner. A further object is the provision of means for operating my stoker automatically, and means whereby the stoker will be under automatic control at all times, and whereby the temperature desired will be automatically controlled and maintained, after first being set to any predetermined degree of heat.

And, finally, my object is the provision of an underfeed stoker for furnaces, wherein I produce a stoker in which I have incorporated many details which are improvements, modifications, and refinements, over that shown in the art, and whereby I am able to produce a stoker which overcomes all of the objectionable features heretofore encountered, thereby producing a stoker which overcomes all fire hazards, greatly decreasing the cost of production, lowering the cost of installation, and at the same time producing a stoker which will require less attention, decreasing the cost of fuel consumption with the same amount of heat developed, and decreasing the cost of production to the minimum.

Other minor objects and particular advantages of this invention will suggest themselves in the course of the following description.

The various features which are new, and which involve invention, will be pointed out in the course of the following description, and the same will be correlated in the appended claims.

The means for carrying out the principles of my invention in a practical and a mechanically efficient manner, is shown in the accompanying drawings, forming a part of this specification, in which—Figure 1 is a side elevation of my complete stoker, showing the same in operative position, but without the usual thermostatic control, which may be incorporated therewith when it is installed. Figure 2 is a front elevation of the same. Figure 3 is a plan view of the conveyor chute, which forms the body or main portion of my stoker, however the upper portion of the hopper, and the fan case, being broken away, the burner crown being shown in place, and the feed worm in dotted lines. Figure 4 is an enlarged detail view of certain parts shown in Fig. 3, taken from the same point of view, but with the crown of the burner omitted, showing the bowl portion of the burner, showing only the rear portion of the conveyor-chute, indicating a portion of the feed-worm in dotted lines, and indicating the point of entrance of the fuel into the bowl of the burner. Figure 5 is an inside front elevation showing certain elements of the speed reduction gears, which are located inside the gear case, taken on the line 5—5 of Fig. 3. Figure 6 is a view similar to Fig. 5, but looking in the opposite direction, and taken on the line 6—6 of Fig. 3. Figure 7 is the same as Fig. 5, but with certain parts omitted. Figure 8 is a detail longitudinal sectional view, taken on the line 8—8 of Fig. 4. Fig. 9 is a plan view of the crown member of the burner. Figure 10 shows a single section of the feed-worm, and a portion of the shaft on which all of the feed-worm sections are secured. Figure 11 is a central vertical section of the crown member, taken on the line 11—11 of Fig. 9. Figure 12 is a cross section of the bowl portion of the burner, taken on the line 12—12 of Fig. 4. Figure 13 is a cross section of the conveyor chute, taken on the line 13—13 of Fig. 1. Figure 14 is a detail section, taken on the line 14—14 of Fig. 1. Figure 15 is a detail view, showing the gear shift lever in off position, that is opposite to that shown in Fig. 2, and Figure 16 is a cross section taken on line 16—16 of Figure 7.

Similar indices designate like parts throughout the several views. In order that the construction, the operation, and the several advantages of my invention may be more fully understood and appreciated, I will now take up a detailed description thereof, in which I will set forth the same as comprehensively as I may.

Referring now to the drawings in detail: A designates a portion of the wall of a furnace with which my stoker is associated. B denotes the floor-line which carries the stoker and the furnace. D designates an electric motor, or its equivalent. And E denotes a fan or air conveying element.

My stoker comprises the main portion, or body, the central part of which forms the chute 1, in which is located the air channel 2, which extends entirely through the member 1, longitudinally thereof.

Numeral 4 denotes the tubular fuel conduit, having a smooth-bore channel 3 extending longitudinally therethrough, and also through the bottom of the hopper 50, into which it opens.

The rear end of the member 4 merges into the bottom of the bowl 12, and the channel 3 opens thereinto. The rear end of the air channel 2 merges into the circular air-chamber 5, which is formed around and concentric with the bowl 12, by means of the housing 6, which is integral therewith. The upper portion of the housing 6 and the wall of the bowl 12 are integrally connected and reinforced by the ties 7. Also extending outwardly from the upper portion of the housing 6 are the lugs 8, whose purpose will hereinafter be explained.

It should now be clear that fuel channel 3 terminates in the bottom portion of the bowl 12, of the burner, as indicated at 18 in Fig. 4, while the air channel 2 opens into air chamber 5 of the bowl.

The forward end of the member 1 carries the hopper 50, whose bottom 51 slants to the slot 52 which is formed therethrough, and which latter opens into the bore 3 of the fuel channel 4. The hopper 50 is provided with a lid or cover 53. The hopper is disposed at an angle, enclining forwardly and upwardly from the member 1.

Located in the channel 3, concentrically therewith, is the shaft 14, on which is rigidly secured a plurality of spiral conveyor screw sections 15, each of which is secured to said shaft by a pair of rivets 16, or otherwise. The rear end of the shaft 14 projects slightly into the bowl 12, from the rear end of the channel 3, which opens thereto. The shaft 14 is at all times retained concentric with the channel 3 by means of the screw sections 15 which contact with the wall of the channel 3, and therefore no bearing is needed for the rear end of the shaft 14, and none is provided.

The shaft 14, and the sections 15 thereon, extend the full length of the slot 52, and adjacent thereto, with the shaft 14 continuing through the forward wall of the hopper 50 and therebeyond, for the purpose hereinafter set forth. Numeral 62 denotes a deflector, shown in Figs. 4 and 12, which projects rearwardly into the bowl 12, from the inner wall thereof, and its curved lower edge registers with the channel 3 as if forming a continuation thereof. Said member 62 serves to deflect the fuel centrally as it is being delivered into the bowl by the worm conveyor, whereby the fuel will not clog up at the point of the delivery into the burner.

The crown portion of the burner, shown alone in Fig. 9, consists of two identical segmental members 30, each forming a half-circle, but they are adapted to be rigidly secured together, by means of a pair of bolts 31, as indicated in Figs. 9 and 11. Said crown is formed in two sections simply for convenience in manufacture, in handling, and in replacement, if such should be required.

The assembled crown member of the burner is adapted to rest on the upper edge of the bowl member, as in Fig. 1, and it is detachably secured thereto by means of the two hook-tongues 19, which are adapted to engage with the respective lugs 8, shown in Fig. 4, of the bowl member of the burner.

Said crown members each consist of an outer body portion 32, with which said hook members 19 are integral, and with their lower edges resting on the upper edge of the housing 6, from which they flare upwardly and outwardly, merging into the top portions 33, which curve inwardly and downwardly. From the lower edges of the members 33 a horizontal outwardly extending shelf member 34 is formed, through which a plurality of comparatively large air discharge slots 35 are formed. From the outer edges of the shelves 34 the inner portion of the crown members extend downwardly and inwardly, forming the inner crown members 36, the lower edges of which are adapted to rest on the upper edge of the bowl member 12.

Formed entirely around through the upper portion of the members 32, are a plurality of comparatively small horizontal air discharge slots 37. The abutting ends of each of the crown sections 30 is closed, whereby there is no communication between the two sections.

Also it will be seen that by placing the crown member on the bowl member and then giving the crown member a slight twist or turn that the tongues 19 will engage the lugs 8 and lock the crown member and the bowl member together, thereby completing the burner.

In practice the forward screw sections 15 are exposed through the slot 52, being located directly thereunder, whereby the fuel will gravitate through the slot 52 directly onto the worm conveyor.

Extending upwardly from the bottom 51 is a shaft 54 on which is idly mounted the agitator 55, which has outwardly and then upwardly curved prongs extending therefrom, as shown in Fig. 3. The shaft is so located that the prongs of the member 55 will mesh with certain of the screw sections, by which means the agitator will be revolved by and concurrently with the worm conveyor.

I provide means for preventing fumes from the furnace from escaping back through the fuel tube 4, in the event that the stoker should cease to be supplied with fuel and the channel 3 be emptied, thereby permitting fumes to escape back into the hopper 50, and possibly into the room in which the stoker is located, particularly if the lid 53 should be open. The said means consists of a trapezium-shaped member 9, which is located in the center, transversely, of the air chamber 2, and it is formed, in this instance, integral with the top of the chute 1 and the wall of the tubular member 4. Said member 9 has formed therein an intake cavity 9', which faces forwardly. Formed vertically through the member 9, and continuing through the top of the member 1 and the wall of the member 4, that is into the fuel channel 3, is a cone-shaped aperture 10, which flares downwardly into the said channel 3. Extending rearwardly horizontally from the center of the face of the cavity 9' is the rearwardly flaring channel 11. The upper end of the cavity 10 is, normally, closed by the plug 13, by which access may be obtained for cleaning.

In the event of the eventuality above mentioned, it will be seen that as there is, without my device just described, no forward air pressure through the channel 3, but by reason of my device there will be a certain amount of air pressure from the chamber 2, which will be shunted around into the fuel channel 3 which, by reason of taking the direction of least resistance, will move rearwardly sufficient to prevent said fumes from moving forwardly through the channel 3, thereby preventing what might otherwise be a dangerous condition to life and property.

Carried by the forward end of the hopper 50 is the gear-case 56, which is secured in vertical position. The shaft 14 of the worm conveyor extends into the case 56, and its forward end is mounted in a bearing socket 57 which is formed on the forward face of the closure plate 56'. Connected with the gear-case 56 is the electric motor D, from which power is taken through the shaft 40. Connected with the other side of the case 56, from that of the motor, is the air blower E, whose discharge opens into the forward end of the air channel 2, whereby the operation of the blower will force the air rearwardly through said air channel 2 and then into the air channel 5 of the burner, to be utilized as herein set forth.

The shaft 40 extends laterally through the gear case 56 and into the blower E, and through which power is transmitted from the motor, which power operates the fan of the blower.

In order to operate the shaft 14 at the proper speed, with relation to the shaft 40, a speed reduction mechanism is required, and it comprises the following: Secured on the shaft 14, inside the gear case, is the gear-wheel 20, which meshes with the pinion 22, which latter is formed integral with the gear-wheel 21. The members 21—22 revolve idly on the shaft 38, which latter is rigidly secured to the gear-case. The pinion 23 and the sprocket wheel 24 are formed integral with each other, and they revolve idly on the shaft 14. The sprocket wheel 24 is formed with the two flanges 24ᵃ with the sprocket teeth 24ᵇ integrally formed therebetween, as shown in Figure 16. The pinion 23 meshes with the gear 21. The small sprocket 25 and the worm wheel 26 are formed integral with each other. The sprocket wheels 24 and 25 are connected by the sprocket chain 39. The worm wheel 26 meshes with the worm 27 which is secured on the shaft 40. Taking it the other way around, which is the direction of operation: The revolving of the shaft 40, carrying the worm 27, will revolve the worm wheel 26, carrying with it the small sprocket wheel 25. The sprocket 25 is connected with the large sprocket wheel 24 by means of the sprocket chain 39. As the sprocket wheel 24 is integral with the pinion 23 the two will be operated by the sprocket chain 39. The pinion 23 will drive the gear wheel 21, and it in turn will drive the pinion 22. The pinion 22 will drive the gear 20, which latter is keyed to the shaft 14. Consequently, the shaft 14 will be rotated, but at a greatly reduced speed from that of the shaft 40 by which it is driven.

It is to be observed that while the worm 27 is secured to the drive shaft 40, the gear wheel 20 is secured to the driven shaft 14, and all of the other gears, of any kind, which are located in the gear case, operate idly.

Inside the gear case, or elsewhere, the shaft 40 is made separable, by means of the coupling 29, whereby either the motor or the gear case can be removed, without disturbing the other.

Located in the gear case is the normally idle gear wheel 28, which meshes with the gear wheel 21, and it is secured on the free shaft 41, which latter is adapted to have a crank (not shown) coupled thereto, whereby the gears in the gear case may be manually turned, which for various reasons may be required. When required, the stem of said crank is to be inserted through the aperture 53 formed through the front of the case 56, which when the gear mechanism is in gear, as in Fig. 5, is closed by the outer end of the lever 49, as in Fig. 2.

In this connection it should be observed that the shaft 14 may be indirectly operated by said crank, but only when the gear mechanism is out of gear with the shaft 40, as in Fig. 7, with the lever 49 turned to the left, as at that time only will said crank aperture be accessible. And at which time the motor D will be cut out by means of the retractable worm wheel 26. This arrangement adds a material element of safety, and ease of manual-operation of the worm conveyor, in the event that the worm fuel drive should become choked, or stuck for any cause.

The means for placing the fuel conveyor into and out of gear comprises the following: The worm wheel 26, together with the small sprocket wheel 25, is adapted to be manually moved into and out of mesh with the worm-gear 27, as follows: Numeral 42 denotes a swinging double bracket, which is mounted to swing on the pivot 43 which is carried by the gear case, and the worm-wheel 26 and the sprocket wheel 25 are adapted to operate freely therein, being mounted on the axle 44. When the wheel 26 is in engagement with the worm 27 the pivot 43 and the axle 44 are approximately in the same horizontal plane with relation to each other, as shown in Fig. 5. Extending laterally from the bracket 42 is an arm 45, which has an adjustable link 46 extending upwardly therefrom. Pivoted on the link 46 is the link 47, which extends upwardly therefrom, with the upper end thereof mounted on the pivot 58, which projects back from the inner end of the stem 48, which pivot is located eccentrically with relation to the stem 48, as shown in Figs. 5, 6 and 7. The outwardly projecting end of the stem 48 has the lever 49 rigidly secured thereto.

When the lever 49 is turned over to the right, as in Figs. 2 and 5, it is evident that the bracket 43 will be turned upwardly to its limit, thereby causing the worm-wheel 26 to engage with the worm 27; and, simultaneously therewith, the sprocket-chain 39, which is always engaged with the teeth of the sprocket wheel 25 and the teeth 24ᵇ of the sprocket wheel 24, will be tightened and the shaft 14 will be driven by the shaft 40, when the motor is in operation. When placed in gear, as stated, the links 46 and 47 will be moved slightly beyond dead-center, whereby the device will be locked in its operative condition.

Now, if at any time, it be desired to throw the device out of gear, that is discontinuing the operation of the shaft 14 without stopping the motor, and still continuing the operation of the fan, then one has only to turn the lever 49 halfover, to the left, which will release the wheel 26 from the worm 27, thus placing the mechanism out of gear, as indicated in Fig. 7.

The stoker, above described, is supported above the floor B by means of a plurality of legs or posts 17, or their equivalents.

The operation of my stoker, briefly stated, is substantially as follows: The device is first assembled, and positioned in connection with a furnace, substantially as shown in Fig. 1. The hopper 50 is then filled with fuel, such as slack, or comparatively fine coal, the lever 49 being reversed from that in which it is shown in Fig. 2.

I next start the motor D, which will operate the fan of the blower E, causing an air current to be forced rearwardly through the channel 2, into the chamber 5, and then downwardly into the combustion chamber of the burner, passing into the combustion chamber through the slots 35. Various ways may be resorted to for starting the ignition in the burner, such, for instance, as placing kindling in the combustion chamber and firing it, in the usual way. When the priming fire is started then the lever 49 may be turned over to the right, which will cause the worm feed to operate at a comparatively slow rate of speed. The operation of the worm feed will accomplish three results: It will draw the fuel from the hopper and force it rearwardly; it will prepare the fuel of such fineness that it will be suitable for immediate combustion; and it will deliver the fuel into the combustion chamber properly, constantly and uniformly.

Presuming that the fuel has been pulverized: It will enter the combustion chamber, where by reason of its fractionated condition, will be quickly converted into combustible form, as the air forced into the combustion chamber, through the slots 35, will supply the proper amount of oxygen, under pressure, and uniformly distributed, into the combustion chamber, from all sides, whereby combustion will immediately transpire and every available particle of usable fuel will be utilized, by reason of which there will be no unconsumed fuel, such as smoke, gas, or cinders to be carried out by the chimney, or otherwise, and the only residue will be a comparatively small amount of vitrified matter, in the nature of clinkers, which can be easily removed, and disposed of.

Also there will be a proper amount of oxygen delivered around the burner, through the apertures 37, to insure the proper combustion above the burner, for the gas which is developed, as well as within the burner, through the apertures 35, for the body of the fuel.

By means of the auxiliary air device, shown in Fig. 8, a small amount of air, under pressure, will be delivered into the fuel just prior to the fuel being delivered into the combustion chamber, and this auxiliary air will tend to accelerate the combustion in the fuel chamber. However the main function of the auxiliary air device is to prevent back-flow of fumes from the furnace into the hopper, in the event that the fuel becomes exhausted.

Another novel and useful feature of this invention is the provision of a sectional feed-screw or worm. This accomplishes several advantages, among which is that it provides a very strong conveyor, and in the event that should one or more of the convolutions of the screw sections become broken, from any cause, it can be easily replaced, without the necessity of an entire new feed screw.

It should also be observed that the agitator 55 operates entirely automatically, and keeps the fuel stirred up so that it will be easily delivered to the feed worm, and will not clog.

In practice the gear case 56 is to be approximately half-filled with oil, and the main bearings are provided with automatic oil feed ducts, as indicated at 59 in Figs. 5, 6 and 7. The motor D may be supplied with electric current, through the wires 60 and 61.

It is to be understood that my stoker may be provided with thermostatic or other automatic control, whereby one need only to start the stoker to operate and keep the hopper supplied with fuel, and the temperature will be maintained at any degree of heat to which the control may be set.

It is to be understood that I provide a stoker which is built of such materials and it is so arranged mechanically, that it will operate without adjustments or replacements for a maximum period of time. The slots 35, shown in Fig. 9, which are formed through the member 34, not only direct the air downwardly under pressure into the combustion chamber, but their position also prevents ash or other material from being carried reversely into the air space 5, which may occur otherwise, especially when the air pressure is not in forced operation.

Various changes may be made in the shape of the parts, and in the details of construction, herein set forth, without departing from the spirit of my invention or sacrificing any of the advantages thereof which are new and useful and which involve invention.

Having now fully shown and described my invention, what I claim, and desire to secure by Letters Patent of the United States, is—

1. A fuel stoker having in combination a burner bowl having inner and outer walls and an air passage formed therebetween, a hopper, a screw conveyor extending from the hopper to the burner bowl, a blower fan, an air passage leading from the fan to the air passage of the burner bowl, and an annular crown bowl rigidly secured to said burner bowl, said crown bowl having an air passage formed therein registering with the air passage in said burner bowl, an inwardly and downwardly extending inner portion, an outwardly extending horizontal portion formed integral with the inner portion and extending partially across the passage of the crown bowl, said outwardly extending horizontal portion having slots formed therethrough whereby air may be forced downwardly and inwardly therethrough and into said burner bowl.

2. In combination with a fuel stoker having a burner bowl formed therewith, said burner bowl having an inner and an outer wall formed integrally therewith and forming a space therebetween, means for admitting air to said space, an annular crown member removably secured to the upper portion of said burner bowl, said crown member having a passage formed therein, the same registering with the space formed between the inner and outer walls of the burner bowl, said crown member having an outer wall and an inwardly and downwardly directed inner wall formed integral therewith, an outwardly extending horizontal portion formed integral with the inner wall and terminating short of the outer wall, said horizontal portion having slots formed therein forming downwardly directed outlets from the passage of the crown member and means for removably securing the crown member to the burner bowl.

3. A fuel stoker having in combination, a body member having an air passage formed therethrough, a fan housing rigidly connected with the body member and located at one end thereof, said fan housing enclosing a rotary fan and having an aperture formed therein and connecting the interior of the fan housing with the air passage of the body member, a burner bowl rigidly connected with the body member and located at the opposite end thereof with relation to the fan housing, said burner bowl having its upper portion open and having an inner and an outer wall forming a space therebetween, said space being interconnected with the air passage of the body member by an aperture formed through its outer wall, lugs formed integral with the outer wall of the burner bowl, an annular crown member having an air space formed therein, said crown member being removably secured to the upper portion of the burner bowl, the lower portion of the crown member being open and registering with the space formed between the inner and outer walls of the burner bowl, said crown member being formed of a plurality of like members rigidly secured together, and a tongue formed integral with each of the like members, each of said tongues engaging a respective lug of the burner bowl.

JAMES E. JONES.